United States Patent [19]

Hollinshead et al.

[11] Patent Number: 4,618,419
[45] Date of Patent: Oct. 21, 1986

[54] LIQUID STORAGE TANK MOISTURE FILTER

[76] Inventors: Clive Hollinshead, 29572 Spotted Bull La., San Juan Capistrano, Calif. 92675; Marion A. Willbanks, P.O. Box 1154, National City, Calif. 92050

[21] Appl. No.: 632,378
[22] Filed: Jul. 19, 1984
[51] Int. Cl.$^4$ .............................................. B01D 35/00
[52] U.S. Cl. .................. 210/167; 210/416.1; 210/416.5; 210/460
[58] Field of Search ............ 210/167, 168, 172, 416.1, 210/416.4, 416.5, 438, 440, 443, 451, 459, 460, 248

[56] References Cited

U.S. PATENT DOCUMENTS

| | | | |
|---|---|---|---|
| 2,626,056 | 1/1953 | Macro | 210/442 |
| 2,928,547 | 3/1980 | Lawrence | 210/451 |
| 3,058,592 | 10/1962 | Nugent | 210/437 |
| 3,389,801 | 6/1968 | Sieger | 210/416.4 |
| 3,900,397 | 8/1975 | Bell | 210/416.4 |
| 3,912,631 | 10/1975 | Turman | 210/439 |
| 4,437,986 | 3/1984 | Hutchins et al. | 210/DIG. 5 |
| 4,502,955 | 4/1985 | Schaupp | 210/DIG. 5 |
| 4,502,956 | 4/1985 | Wilson et al. | 210/248 |

Primary Examiner—Andrew H. Metz
Assistant Examiner—Sharon T. Cohen
Attorney, Agent, or Firm—Wm. Jacquet Gribble

[57] ABSTRACT

A storage tank for liquids, such as a fuel tank, has inlet and outlet ports that liquid lines connect to input and output ports of a liquid pump, and a filter is connected between the pump outlet and the tank so that liquid from storage may be constantly or periodically passed through the filter and back to the tank. The liquid may be withdrawn from the tank to be used at any time since the liquid or recirculating pump is independent of the supply pump or pumps from the storage to the use.

The filter has an outer cannister with opposed ends and a paper filter core with a hollow center. One cannister end has input and outlet ports and a collector volume between the end and the paper core. The core may divided into sequential elements about a fluid entry tube connected to the cannister input port and penetrating a manifold cavity within the cannister between the core end and the cannister end wall. A restrictive port in the entry tube diminishes cannister pressure to protect the paper core. Preferably the entry tube and a cannister end are mechanically associated so that all may be removed from the cannister as a unit, for inspection and paper core replacement.

3 Claims, 5 Drawing Figures

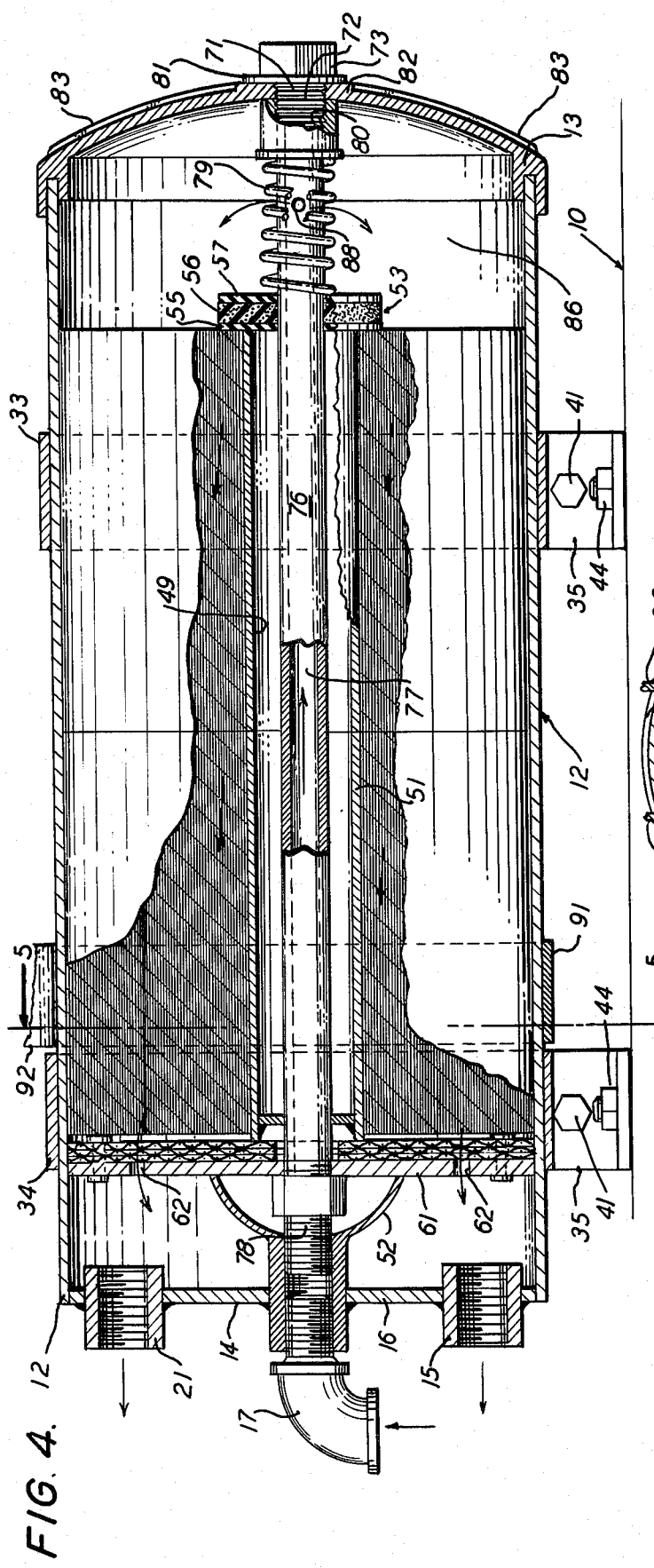
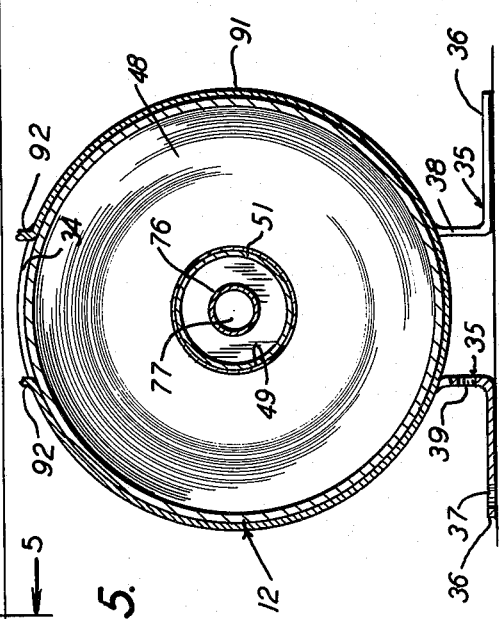
FIG. 4.
FIG. 5.

LIQUID STORAGE TANK MOISTURE FILTER

BACKGROUND OF THE INVENTION

The invention relates to fluid filters with cellulose cores and more particularly to fuel and lubricants filters for use with over the road equipment, marine and stationary engines, and high capacity transformers. Such equipment requires high pressure fuel, lubrication and supply lines that are destructive of cellulose type filters because of the extreme pressures. This present application is also related to the previous application of co-inventor M. A. Willbanks, now abandoned, Ser. No. 780,072 filed Mar. 22, 1977 and entitled, Continuous Roll Cellulose Filter For Liquids. Prior art cited in that application was:

U.S. Pat. No. 2,626,056; Macro; 1-20-53
U.S. Pat. No. 3,058,592; Nugent; 10-16-62
U.S. Pat. No. 3,912,631; Turman; 10-14-75
U.S. Pat. No. 483,294; Canada (Frantz); 4-57
U.S. Pat. No. 539,770; Great Britain; 7-36

The present invention, with its combination of paper core and restricted flow filter to protect the core, and a continuing circulation of liquid through the filter from storage and supply, differs markedly and patentably from the art set forth above. The present invention contemplates a pump and filter system that overcomes the deterioration of filter element due to high pressure and provides a filter of the cannister type that is easy to service and dependable in operation. The particular arrangement of components of the invention is such that the internal filter portions may be removed from the cannister as a unit by a simple unthreading operation.

SUMMARY OF THE INVENTION

The invention contemplates moisture filtering apparatus with a supply tank supporting an elongate cannister containing one or more continuous roll paper cores with hollow centers, the combination which comprises a filter pump, a cap at each end of the cannister and an entry port and an exit port for liquid in one of the end caps. The exit port opens into a collector volume between the paper core and the end cap. A fluid entry tube connects to the entry port and extends through the hollow center of the paper or cellulose cores to a manifold cavity defined by cannister walls between the paper cores and the opposite end cap. A restrictive outlet from the entry tube communicates through the manifold cavity to the paper core, the hollow being sealed from the cavity such that liquid to be filtered passes through the paper roll and not through the hollow center, restraining both particulate and moisture in the roll. Thread means removably secure the unported opposite end cap to the cannister end. Preferably the securing means is combined the liquid entry tube such that the entry tube and the paper core and paper core screens may be removed as a unit with the opposite end cap.

Also, it is preferred that the circulating filter pump be mounted upon the filter cannister so that the entire unit may be secured to the tank or other convenient situs to reduce the length of the liquid lines needed to circulate the liquid from the tank through the filter and back to the tank for withdrawal to use, either in an engine or in a lubricating sump or in a transformer housing.

The filter system made possible by the inventive apparatus has particular utility in fuel systems such as engines, heaters and other devices where there may be long time storage of the liquids used and where pollutant particles and moisture content cause problems such as uneven burning, smoking, fuel injector deterioration or crystallization. The inventive apparatus replaces gravity separation of oil and water and the problems attendant thereto. In engines the burn is cleaner, crankcase lubricants are not polluted by moisture nor filter replacements needed any more frequently than four to five thousand miles of travel on road vehicles.

These and other advantages of the invention are apparent from the following detailed description and drawing.

BRIEF DESCRIPTION OF THE DRAWING

FIG. 4 is a longitudinal sectional view taken along line 4—4 of FIG. 3; and

FIG. 5 is a fragmentary transverse sectional elevational view taken along line 5—5 of FIG. 4.

In the various Figures like parts are identified by like reference characters.

DESCRIPTION OF THE PREFERRED EMBODIMENTS

Figure 1:
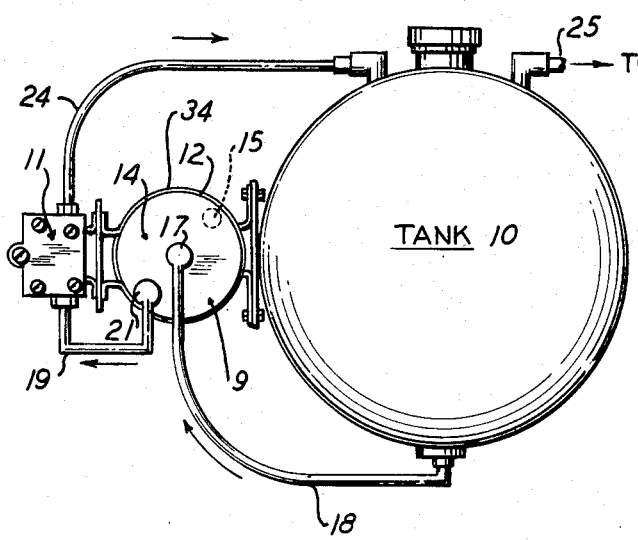
FIG. 1 is a schematic elevational view, to a reduced scale, of the filter, filter pump and supply tank of an apparatus for a vehicle or other engine, all in accordance with the invention.
Figure 2:
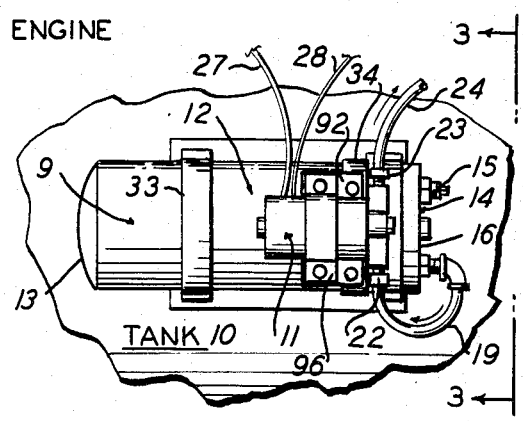
FIG. 2 is a fragmentary plan view of the embodiment of FIG. 1.
Figure 3:
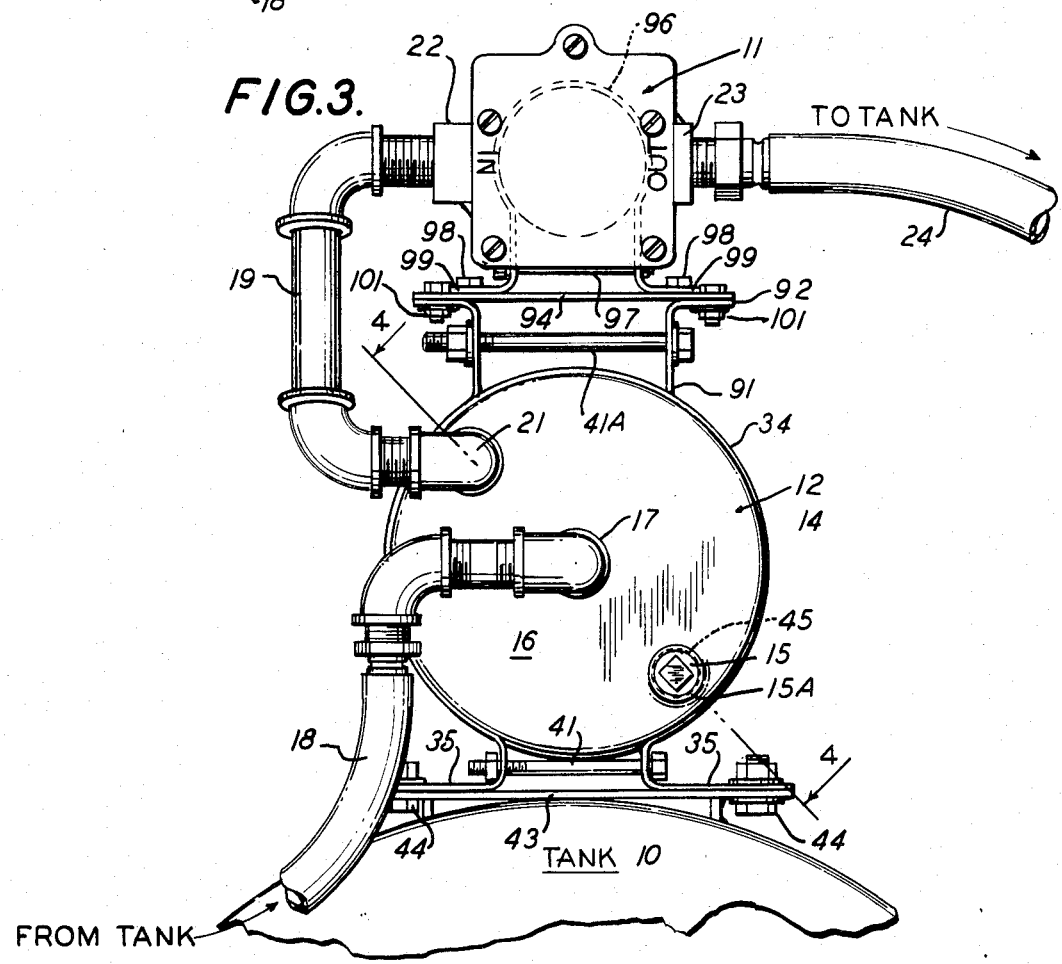
FIG. 3 is a fragmentary end elevational view, partly broken away, taken along line 3—3 of FIG. 2.

In FIGS. 1 through 3 a fluid filter 9 supported by a storage tank such as fuel tank 10 in turn supports a circulating pump 11. A cannister 12 of generally cylindrical configuration houses the filter and has a removable obverse end cap 13 and a fixed reverse cap 14. Reverse cap 14 has a cleanout plug 15 threadedly engaged in a nipple 15A fixed in cap wall 16. A central pipe fitting 17 receives an input line 18 from tank 10 for which the filter operates. A return line 19 connects through reverse cap 14 by means of a second pipe fitting 21, to the circulating pump inlet 22. A pump outlet 23 receives a fluid line 24 which returns filtered liquid to tank 10, or other storage apparatus. A fuel supply line 25 exits the tank and takes liquid to the use machine, whether engine, burner or other device. A supply pump (not shown) may be used to impel liquid from the tank through the line 25 to the use.

While the filter and the circulating pump are shown in the present embodiment supported on the tank it is to be understood that the three elements—tank, pump and filter cannister—may be fixed in any arrangement suited to the space requirements of the particular situation. The illustrative arrangement has been found best suited to heavy engine requirements.

Since the circulating pump is independent of the supply pump, circulating pump electrical leads 27, 28 may be constantly powered or intermittently energized remotely in accord with the instant need. Also, the pump 11 may either A.C. or D.C. powered, depending again upon its situs.

The filter has a cellulose or paper core and is therefore well adapted to removal of undesired particulate matter but also to the reduction of moisture which condensation causes in storage tanks and other vessels. Thus, considering the deterioration of engine parts and performance caused by moisture in fuel, it is normally desired to operate the circulating pump constantly to purify the fuel for use at any time. Fuel from the tank is drawn to the filter through line 18 and processed throught the filter core and to the circulating pump through line 19 and then returned to the tank from the pump through line 24. Withdrawal from the tank by line 25 may be as desired.

As is best seen in FIG. 3, filter cannister 12 is encircled by longitudinally spaced brackets 33, 34 each of which terminates at each of its ends in an L-shaped foot 35. A horizontal portion 36, as viewed in FIG. 3, has a fastening aperture 37, and a vertical portion 28 has a horizontal aperture 39, as best seen in FIG. 5. A tension bolt 41 extends through both apertures 39 of the spaced feet 35 to afford means for securely fixing each bracket 33, 34 to the cannister.

While the cannister 12 is shown in longitudinally horizontal orientation in FIGS. 1-3, it may operate in longitudinally orientation as well, and the brackets 33, 34 are adaptable to universal mounting in any filter orientation. As shown in FIG. 3, a mounting plate 43 on the tank receives bolts and nuts such as fastener assembly 44 to secure the brackets and the filter removably to the tank. While horizontal in orientation in FIG. 3 it is obvious that the mounting plate can be in any attitude.

As is clear in FIG. 3 plug 15 may be a common pipe plug threadably engaged in a threaded hole 45 of reverse cap 14. In FIG. 4 pipe fitting 17 is seen to be a short nipple welded in place in an aperture 46 at the center of the reverse cap wall 16. Pipe fitting 21 may be a reducing bushing welded in place in a peripheral aperture 47 of the reverse cap.

As previously mentioned cannister 12 contains a tandem pair of continuous roll filter core elements such as the cores 48 of paper or other cellulose product. Each core has a hollow center chamber 49 fitted over a mounting mandrel 51 for the filter cores.

The mandrel has a spacer ring 52 at its end near the reverse cap and a sealing assembly 53 near the obverse cap. The sealing assembly comprises a stop disc 55 fixed as by welding to the mandrel, a central resilient member 56 and a thrust ring 57 on the opposite side of the resilient member 56, which is preferably of Neoprene.

Several materials are suitable for the mandrel, but copper tubing of approximately one and one quarter inches (1¼") diameter is preferred, therefore copper or brass is preferable for the material of the stop disc 55 and thrust ring 57, in which case the ring is brazed rather than welded to the mandrel tube.

Pipe fitting 17 acts as a stop for a perforate plate 61, which has a plurality of flow passages 62 (FIG. 4) which open into a collector volume 63 defined by wall 16 of the reverse end cap, the interior of the cannister and plate 61. This volume (63) connects to an exit port defined by pipe fitting 21 and connected to return line 19. Paper filter core 48 does not contact the support plate directly but a plurality of metallic screens such as the three parallel screens 64 intervene between the core plate to provide channels between roll end and end cap for liquid circulation.

A plurality of rivets 65 secure the screens to plate 61, the length of the rivets being chosen such that the screens are not compressed together unduly at the point of fastening. Obverse cap 13 is bell-shaped in configuration and has an annular ring 66 that surrounds an end 67 of the cannister. A resilient seal 68 is clamped between cannister end 67 and the obverse cap. Obverse cap 13 also has a central aperture 71 through which a threaded shank 72 of a plug screw 73 intrudes inwardly of the end cap to engage a coupler 74. The coupler has an internal thread 75 with which plug screw 73 is jam-fitted to secure the coupler to the end cap. A fluid entry tube 76 with an entry channel 77 has one end 80 engaged with the coupler and extends through hollow mandrel 51 about which the hollow paper filter cores are supported. A remote threaded end 78 of entry tube 76 is threadably engaged with central pipe fitting 17 of reverse cap 14 to secure the obverse cap 13 and the entry tube to the cannister. The obverse cap, plug screw, entry tube & mandrel form a unit which is removable from the cannister with the paper cores when the entry tube end 78 is disengaged from fitting 17.

A compression spring 79 about entry tube 76 urges resilient sealing assembly 53 and the filter cores toward perforate plate 61, further compressing member 56 about entry tube 76 in sealing relationship. A similar seal is achieved about plug screw and the cap 13 by a metallic washer 81 bearing against the outer surface of the end cap at a boss 82 at the central convergence of the cap ribs 83, closing any apertures between elongate chamber 49 of the cores and the manifold cavity 86 defined by by cannister inner wall, filter core but and end cap 13.

When assembled the entry tube, seal 53 spring 79, plug screw 72, and the end cap 13. The cap, however, is rotatable with respect to the rest of the assembly, permitting torquing of the entry tube to close the obverse cap after inspecting and changing paper filter cores 48 without abrasive effect upon seals 53 and 81.

A restrictive orifice 88 at the tube end remote from entry to the cannister connects to channel 77, to discharge a metered amount of liquid to be filtered into manifold cavity 86. This discharge through orifice 88 is under pressure and the discharged liquid flows through the paper cores, or other filter medium, with the consequent removal of particulate matter and moisture with each passage if the liquid from storage through the filter, and thence through the screen as indicated by the direction arrows of FIG. 4 and out an exit fitting 21 and through circulating pump 11 and return line 24 back to the tank or other sump or storage vessel.

In the specific embodiment a pair of four and three-quarter inch (4¾") diameter paper tissue rolls of combined length of nine and one-half inches (9½") surround an one-quarter inch (¼") pipe entry tube having a restricted orifice of five sixty-fourth inch (5/64"). While only a single discharge orifice is shown the invention does not preclude using a plurality of orifices so long as the total aggregate discharge port area does not exceed that of a single 5/64" orifice. The exit pipe may also be one-quarter inch (¼") pipe diameter which, at normal operation pressures, establishes a flow pattern of one gallon a minute of liquid to pass through the filter.

The sealing loading need not be severe, spring 79 normally being two and one-half inches (2½") long, of 55 gauge spring steel. Using Scott Paper Company toilet tissue mounted on one and one-quarter inch (1¼") copper mandrel, has produced cleaning to 0.25 micron particle size and substantial reduction in entrained moisture. Depending upon the material to be filtered, corrosion resistant material such as copper, brass and stainless steel are preferred.

In operation the filter acts as a by-pass filter with desired amounts of the fuel, lubricating or insulating fluid being withdrawn from supply and processed through the filter by means of the circulating pump and lines. The normally high pressures of fuel and lubricating systems are reduced by the restrictive orifice so that the filter system need not be designed to otherwise protect the paper cores against the effects of extremely high liquid pressures.

The filter portion of the invention is easily serviced by the unthreading of the entry tube from pipe fitting 17 in the reverse cap and removing the entire core assembly. The screens 64 and their support plate 61 may be then removed from the mandrel after which the used paper filter core or cores may be removed and replaced with fresh filter material.

Servicing the filter may be done without disturbing the pump 11 which circulates the liquid from the tank through the filter. The pump is secured to the filter independently of the cannister brackets 33, 34 that secure the filter. A single bracket 91 similar in most respect to brackets 33, 34 is oppositely oriented in that its feet 92 extend upwardly in FIG. 3 to be bolted to a support plate 94. The plate 94 accepts a fourth bracket 96 that encircles the circulating pump 11, as best seen in FIG. 2. An elongate bolt 97 restricts the fourth bracket about the pump body and fastener sets of nut and bolt 98 secure the feet 99 of the bracket 91 to the support plate. Similar fastener sets 101 secure support plate 94 to feet 92 of bracket 91 which is secured about the cannister by an elongate bolt 41A.

By disconnecting lines 19 ln 24 the circulating pump may easily be detached from cannister bracket 91 for inspection and service. In like manner the cannister of the filter and the pump may be removed from the tank by detaching lines 18 and 24 for service beyond filter core changes.

Apparatus modifications within the scope of the invention may occur to those skilled in this particular art. It is therefore desired that the invention be measured by the appended claims rather than by the illustrative embodiments shown and described herein.

We claim:

1. In a liquid fuel system having a fuel tank with connections to a fuel pump and a fuel consuming device and to a fuel filter having input and output ports the combination comprising fuel tank having first and second ends; a fuel filter; a recirculation filter pump;

a first fuel line operatively connected from said first fuel tank end, to a port of said fuel filter, a second fuel line operatively connected between said recirculating pump and said second fuel tank end, a third line connecting said recirculating pump to said fuel filter; said fuel filter comprising a cannister with opposed ends, a paper filter core having a hollow center, obverse and reverse cannister end caps, input and output ports in said reverse cannister end cap, a collector volume between said paper core and the reverse end cap inner wall, said output port opening into said volume;

a fluid entry tube connecting to said input port and extending through said hollow center of said paper core, walls defining a manifold cavity between said paper core and said obverse cap inner wall, said entry tube entering said cavity; a restrictive outlet from said entry tube being the only communication through said manifold cavity to said paper core;

a seal between the cavity and the paper core hollow center;

and means removably securing said obverse cap to said cannister end.

2. In a liquid fuel system having a fuel tank with connections to a fuel pump and to a fuel consuming device and to a fuel filter with input and output ports, the combination comprising fuel tank having first and second ends; a fuel filter; a recirculation filter pump;

a first fuel line operatively connected from said first fuel tank end, to an input port of said fuel filter, a second fuel line operatively connected between said recirculating pump and said second fuel tank end, a third fuel line connecting said recirculating pump to said fuel filter output port;

said fuel filter comprising a cannister with opposed ends and a tandem pair of paper filter cores each having a hollow center, obverse and reverse cannister end caps, input and output ports in said reverse end cap, a collector volume between the one paper core and an end cap inner wall of the reverse cap, and said output port opening into said volume;

a transverse screen in said volume between said core and said inner wall, a fluid entry tube connecting to said input port and extending through said hollow center of said paper cores, walls defining a manifold cavity between a paper core end and said cavity; a restrictive outlet from said entry tube being the only communication through said manifold cavity to said paper cores, a seal between the cavity and the core hollow centers;

and means removably securing said obverse cap to said cannister end.

3. Apparatus in accordance with claim 2 further comprising first means securing said cannister to said tank, and second means securing said recirculating filter pump to said cannister.

* * * * *